United States Patent Office 3,038,876
Patented June 12, 1962

3,038,876
PROCESS OF POLYMERIZING A POLYURETHANE OR POLYUREA RESIN IN THE PRESENCE OF A POLYACRYLONITRILE AND PRODUCT FORMED THEREBY
John Farago, Wilmington, Del., assignor to E. I. du Pont de Nemours and Company, Wilmington, Del., a corporation of Delaware
No Drawing. Filed Jan. 27, 1958, Ser. No. 711,121
2 Claims. (Cl. 260—45.5)

This invention has to do with new compositions of matter, more specifically with combinations of high molecular weight synthetic organic polymers and with a process for producing them.

Synthetic organic polymers of high molecular weight are well known and widely used in commerce today. Homopolymers, or polymers containing a single type of structural unit making up the long polymer chain, are perhaps the most widely used. However, two or more polymer ingredients are frequently combined to obtain a composite structure which has desirable physical, chemical or aesthetic properties differing from the homopolymers which go into it. In general, copolymers are made by combining, during the course of polymerization, two or more different polymer-forming ingredients so that chemical bonds link the components. In the case of addition type polymers, a typical chemical bond linking different components is the carbon-to-carbon bond which forms in the same way during the polymerization of a homopolymer. In the case of condensation polymers, where more frequently two coreactive materials are combined to form a homopolymer, a third and frequently a fourth ingredient will be added and all of these intermediates coreact to form long chain polymers containing, for example, ester linkages, amide linkages or urea linkages, separately or in combination.

In addition to the copolymerization reactions indicated above, other methods of combining two or more condensation polymers or two or more addition polymers have been employed. Under some circumstances, when both ingredients of the desired combination are soluble in a common solvent, solutions of the two polymers in the solvent can be mixed. In other cases where both polymer components are molten and chemically stable in the same temperature range they can be melt-blended. While techniques of this type have been found to be successful in specific cases, by far the majority of cases show only moderate success. Blended solutions, even in a common solvent, are not always compatible and even when such solutions are compatible on mixing, it is frequently found that separate phases are formed when a mixture is allowed to stand for some time. Polymers blended in the molten state may be compatible at first, but they, too, frequently have a tendency to break up later into separate phases.

Even when it is found that two bulk phases can be prepared in a compatible stable mixture, it is only seldom that such physical mixture, in the absence of chemical bonding between the two polymer compositions, can be processed into useful shaped forms such as fibers, filaments and films so as to retain a compatible system after the processing is complete. Usually the final structure is found to contain discrete regions of each polymer constituent. This phenomenon of phase separation is well known and is discussed, for example, in a series of articles by D. M. Cates and H. J. White entitled "Preparation and Properties of Fibers Containing Mixed Polymers." Three of these articles appear in the Journal of Polymer Science XX, 155–80, 181–95 (1956), XXI, 125–138 (1956). These articles have particular reference to mixtures of polyacrylonitrile with a number of other polymeric substances and indicate that there was little success in obtaining truly compatible and homogeneous mixtures.

Perhaps the most difficult combination to prepare is that of an addition polymer with a condensation polymer. The difference in chemical structures of the polymers makes for incompatibility and in general, there is no possibility that chemical bonds can be formed between the two constituents.

It is an object of the present invention to provide a polymer mixture of a high molecular weight addition polymer with a high molecular weight condensation polymer giving a system which is compatible both in the bulk phase and in the form of shaped objects such as fibers, filaments and films can be prepared by further processing of the bulk phase. Another object is to provide fibers, filaments and films consisting of compatible blends of a high molecular weight addition polymer and a high molecular weight condensation polymer.

A further object is to provide a process wherebey such compatible polymer mixtures can readily and simply be prepared in high molecular weight.

These and other objects will become apparent in the course of the following specification and claims.

In accordance with the present invention, an intertwined molecular combinaton of a condensation polymer and an addition polymer is provided, the said intertwined molecular combination being characterized by a homogeneous compatible single phase, the said condensation polymer being derived from an aromatic diisocyanate and being selected from the class consisting of a polyurethane and a polyurea, and the said addition polymer containing at least about 50% acrylonitrile components by weight. The process by which these products are obtained consists in the polymerization of an aromatic diisocyanate with a coreactive condensation-polymer-forming bifunctional component taken from the class comprising primary and secondary diamines, diphenols having at least three carbon atoms between the hydroxyl groups, diols, and mixtures thereof in a solution containing a substantial amount of a vinyl type polymer being made up to the extent of at least 50% of acrylonitrile units, in a liquid which is a solvent for each polymer composition separately, the vinyl type polymer being present in the solution to the extent of at least 10% by weight of the theoretical amount of condensation polymer which could be obtained from the diisocyanate and its coreactant. By the practice of this invention, there are obtained combinations of two originally incompatible polymers which form a homogeneous system stable to further processing from the solution in which it is originally formed.

As has already been indicated, the advantages of the present invention lie in the fact that a solid phase homogeneous mixture of two saparate polymer components can be obtained. Homogeneity of these structures is apparent from the physical behavior, specifically in regard to the fact that fibers, films and the like can be prepared which are clear and do not show any tendency for the components to separate. In addition, however, when these polymer structures are examined by microscope and electron microscope, no evidence is found of phase separation even at the electron microscope level. Thus, these structures are clearly different from mixtures of polymer described in the prior art, as, for example, in the articles by Cates and White already mentioned.

Homogeneity of polymer mixtures of this type is technologically significant and commercially important because true uniformity of behavior cannot be obtained unless the composition is the same throughout. This homogeneity has not been achieved before with compositions of the present type and is the valuable advance of this invention. Examination of the polymer mixtures of the present invention indicates the components are molecularly intertwined.

The utility of this invention becomes apparent when it is realized that now for the first time it is possible to combine two classes of polymer compositions which have hitherto been considered incompatible because of the differences in chemical structure. The composite polymer mixture is homogeneous and consists of a single phase. This means that whatever modification of properties is desired will be exhibited by these compositions in a uniform and continuous manner throughout. Thus, for example, if it is desired to obtain a polymer composition with increased dyeability to a certain class of dyestuffs, it is possible by practice of the present invention to obtain fibers which will dye uniformly in the desired manner. There will be no isolated spots or streaks in which dyeability varies because the polymer compositions have separated into discrete phases.

In addition, it is possible to modify or control the solubility of one of the polymeric components of this invention by combining with it in an intimate mixture of the present type a second polymer component with different solubility behavior. As the examples below show, when the two polymer ingredients are each dissolved separately and the solutions mixed, a single phase is not obtained. However, by the practice of the present invention, composite polymer structures result which behave like a single phase and this behavior persists throughout such varied chemical and physical treatments as dissolving, precipitating, spinning into fibers and casting into films. This consistent behavior is due to the fact that the two polymeric ingredients are mixed and interentangled at the molecular level so that there is no tendency on the part of the ingredients to separate themselves into discrete regions. Moreover, stability of such solutions is frequently greater than the stability of either of the polymers in solution separately.

The following examples are cited to illustrate the invention. They are not intended to limit it in any manner. The reference in the examples to "parts" indicates parts by weight.

*Example I*

A solution of 3.75 parts of high molecular weight polyacrylonitrile in 28.5 parts of dimethylformamide is cooled and 0.87 part of tolylene-2,4-diisocyanate dissolved in 4.8 parts of dimethylformamide is added. After the combined solution becomes homogeneous, 1 part of bis-(4-aminocyclohexyl)methane dissolved in 9.5 parts of dimethylformamide is added resulting in a clear viscous solution. Upon evaporation of solvent from a portion of this solution, a single phase solid material which is firm and hard forms. It is not possible to separate the two components of the polymer mixture by physical means. However, the estimated inherent viscosity of the polyurea formed in the presence of the polyacrylonitrile is 0.46.

*Example II*

A solution of 51.2 parts of polyacrylonitrile in 200 parts of dimethylformamide is cooled and separated into two equal portions. To one portion 3.9 parts of 2,5-dimethylpiperazine dissolved in 28.5 parts of dimethylformamide is added while 8.9 parts of bis-(4-isocyanotophenyl) methane in 24.7 parts of dimethylformamide is added to the second. The two solutions are then mixed with ice cooling. The reaction occurs over a period of less than half an hour and the clear solution which results contains 20% solids by weight. A fiber is spun from this solution, drawn 8 times its extruded length at 150° C. through a heated tube and thereafter dimethylformamide is extracted with water. After boil-off, the drawn fibers (denier of 1.5) have a fiber stick temperature in the range 196° to 215° C., a tenacity of 4.9 g.p.d., an initial modulus of 71 g.p.d. and they may be elongated 21% without breaking. No tendency to separate into distinct phases is observed in the fibers and on microscopic examination no isolated regions of either polymer constituent is noted. The physical properties obtained are consistent with a homogeneous material.

*Example III*

A solution of 60 parts of polyacrylonitrile in 234 parts of dimethylformamide is used to combine, in a manner similar to that described in Example II, 1.86 parts of 2,5-dimethylpiperazine in 10 parts of dimethylformamide and 4.15 parts of bis-(4-isocyanotophenyl) methane in 20 parts of dimethylformamide. The resulting solution is spun from dimethylformamide through a 10-hole spinneret with a windup speed of 194 y.p.m. and a spin stretch factor of 2.8. The yarn, boiled off after drawing 8× in atmospheric stream, has a tenacity of 4.7 g.p.d. with an elongation of 21% and an initial modulus of 62 g.p.d.

*Example IV*

A solution of a copolymer of 94% by weight acrylonitrile and 6% by weight methylacrylate is prepared from 67.5 parts of the copolymer and 220 parts of dimethylformamide. The cooled solution is used to prepare a polyurea from dimethylpiperazine and bis(4-isocyanotophenyl)methane in the same proportions as given in Example III. The resulting solution containing 22½% solids is spun into fibers through a 10-hole spinneret with a windup speed of 194 y.p.m. and a spin stretch factor of 2.25. The yarn is passed over a hot pin held at 110° C. to remove solvent and is then drawn over a hot pin at 162° C. to an actual draw ratio of between 5 and 6 times its extruded length. Because of plastic flow, the total elongation of this fiber is 8×the extruded length. The fibers are thereafter passed through a steam jacket (20 pounds' pressure) and given a further draw of 2 times. The fibers obtained from this double drawing process have a tenacity of 6.7 g.p.d. and an elongation of 9.4% at the break, an initial modulus of 133 and an individual filament denier of 0.66.

*Example V*

A solution of 3.75 parts of polyacrylonitrile in 32 parts of dimethylformamide is used to prepare a polyurea in the same manner as that described in Example I except that the diamine is added to the polyacrylonitrile solution and the diisocyanate dissolved in dimethylformamide is thereafter added to the combination. Two parts of the diamine and 1.7 parts of the diisocyanate in 4.8 parts of dimethylformamide are used. This set of proportions gives a clear polymer mixture of 50% acrylic polymer and 50% polyurea. A control solution obtained by adding equal quantities of two solutions of dimethylformamide, one containing polyacrylonitrile and the other containing a homopolymeric polyurea from the same reactants is lumpy and gelled.

*Example VI*

Forty grams of a copolymer of acrylonitrile and methyl acrylate as described in Example IV having an inherent viscosity of 1.46 is dissolved in 180 ml. of dimethylsulfoxide. 2.23 g. of ethylene glycol and then 10.01 g. of bis(4-isocyanotophenyl)methane is added to form a reaction mixture which is heated with stirring at 120–130° C. for 1½ hrs. A polymer mixture containing 80% acrylic polymer and 20% polyurethane is obtained.

Approximately 15% of the excess solvent is removed under reduced pressure from the mixture formed above and the resulting viscous solution is dry spun through a five hole spinneret at a wind-up speed of 100 y.p.m. The as-spun fiber, extracted in water and drawn 8× through steam has a tenacity of 5.6 g.p.d., an elongation of 29% at break and an initial modulus of 63 g.p.d. At a 20× draw ratio the product has a tenacity of 5.6 g.p.d., elongation 20% and initial modulus 61. Generally about 14× is the maximum at which a yarn from an acrylic copolymer can be drawn.

While the examples given above show the preparation of polyureas and polyurethanes in dimethylformamide and in dimethylsulfoxide solutions of acrylic polymers, it is also possible to use other solvents such as dimethyl acetamide, N-methylpyrrolidone, and the like. The principle governing the selection of a suitable solvent is merely that it must be the solvent for each of the components separately and that the solvent must not be reactive with either the aromatic diisocyanates or the diamines, glycols and diphenols which are used to prepare the polyurethanes and polyureas as already described. It is preferred to practice the process of this invention at moderately low temperatures. In general, temperatures between 0° C. and 60° C. are most satisfactory and it is necessary only that the solvent be inert toward the polymer reactants in this temperature range.

As the examples show, a variety of diamines can be used. Aromatic, aliphatic and alicyclic diamines are suitable, both primary and secondary. Obviously, the diamine must have reactive hydrogen groups to form the desired polymer, so tertiary amines are not suitable. Similarly, a wide range of dihydroxy compounds can be used. Glycols such as ethylene glycol and propylene glycol in which the hydrocarbon chain contains not more than 6 carbon atoms are most useful. In the case of diphenols, the hydroxy groups can be on the same phenolic ring or on separate rings. There should be, however, at least three carbon atoms between hydroxy groups.

While the preferred embodiment of the present invention is that in which an acrylic polymer is combined with a polyurea or a polyurethane, it has been found to be possible to use the same principle in a number of other specific polymer compositions. For example, it is possible to prepare a solution of a synthetic elastomer such as neoprene in a chlorinated hydrocarbon and then to use this solution as one solvent in a two-phase interfacial polymerization in which, for example, piperazine can be reacted with the bischloroformate of ethylene glycol to make a polyurethane. Such interfacial polymerizations are already known and have been described in copending application S.N. 226,065, filed May 12, 1951. Another modification of the same principle is that in which a natural rubber is dissolved in an aromatic hydrocarbon, e.g., benzene, and this solution is used as the organic solvent in a two-phase condensation polymerization of the interfacial type for making a polyurethane or a polyamide.

One of the advantages of the polymer mixtures of the present invention becomes apparent in end uses where adhesion between two substances needs to be improved. For example, the fibers described in the preceding examples are suitable for use as reinforcing materials for plastic sheets and molded objects. If it is desired to reinforce a sheet of an acrylic polymer, such as polymethylmethacrylate, fibers of the type described in Example II, would provide excellent adhesion to the plastic because of the fact that the fibers contain an acrylic polymer which is similar in chemical nature to the plastic which they are intended to reinforce. Equally well, if it is desired to improve the adhesion between an elastomer and a reinforcing cord in such structures as tires, conveyor belts, V-belts and the like, there can be employed as an adhesive an interentangled polymer mixture made up as described in the preceding paragraphs partially of the synthetic elastomer and partially of the polymeric material which constitutes the reinforcing cord. The same principle can be employed with natural elastomers and an adhesive of this type can be used to bond polyamide tire cords to natural rubber by employing a mixed adhesive containing both natural rubber and a polyamide prepared by condensation polymerization.

Many equivalent modifications of the above will be apparent to those skilled in the art without a departure from the inventive concept.

I claim:
1. A process which comprises:
    (1) dissolving an addition polymer from the class consisting of polyacrylonitrile and a copolymer of about 50% acrylonitrile, the remaining copolymeric units being derived by addition copolymerization from methyl acrylate, in a solvent from the class consisting of dimethylformamide, dimethylacetamide, N-methylpyrrolidone and dimethylsulfoxide;
    (2) and thereafter adding at a temperature of about 0° C. and as a solution from a solvent of the same class;
        (I) an isocyanate from the class consisting of bis-(4-isocyanotophenyl)methane and toluene-2,4-diisocyanate, and
        (II) a member of the class consisting of bis(4-aminocyclohexyl)methane, 2,5-dimethylpiperazine and ethylene glycol;
    (3) mixing the resulting solution at the temperature of about 0° C. to promote reaction between (I) and (II);
    (4) and thereafter removing solvent by evaporation to form a clear homogeneous mixture of addition and condensation polymer.
2. The composition formed by the process of claim 1.

References Cited in the file of this patent

UNITED STATES PATENTS

| | | |
|---|---|---|
| 2,762,718 | Kleiner et al. | Sept. 11, 1956 |
| 2,852,483 | Mason | Sept. 16, 1958 |

FOREIGN PATENTS

| | | |
|---|---|---|
| 883,139 | Germany | July 16, 1953 |
| 908,133 | Germany | Apr. 1, 1954 |